(12) United States Patent
Bouillet et al.

(10) Patent No.: US 11,413,851 B2
(45) Date of Patent: Aug. 16, 2022

(54) HYBRID POLYMER FOR VISCO-ELASTIC PLASTIC SPACER

(71) Applicant: SAINT-GOBAIN GLASS FRANCE, Courbevoie (FR)

(72) Inventors: Fabien Bouillet, Compiegne (FR); David Shackleford, Framingham, MA (US); Jocelyn Rebufa, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/633,322

(22) PCT Filed: Jul. 23, 2018

(86) PCT No.: PCT/FR2018/051887
§ 371 (c)(1),
(2) Date: Jan. 23, 2020

(87) PCT Pub. No.: WO2019/020923
PCT Pub. Date: Jan. 31, 2019

(65) Prior Publication Data
US 2020/0156354 A1    May 21, 2020

(30) Foreign Application Priority Data
Jul. 24, 2017   (FR) ...................... 1757020

(51) Int. Cl.
*B32B 17/10* (2006.01)
*B32B 7/12* (2006.01)

(52) U.S. Cl.
CPC .......... *B32B 17/10761* (2013.01); *B32B 7/12* (2013.01); *B32B 17/10036* (2013.01);
(Continued)

(58) Field of Classification Search
CPC ......... B32B 7/00–7/14; B32B 17/00–17/1099; C09D 133/00–133/26;
(Continued)

(56) References Cited

U.S. PATENT DOCUMENTS

| 6,074,732 A | 6/2000 | Garnier et al. |
| 2002/0061395 A1* | 5/2002 | Moran .................... B32B 17/10 428/215 |

(Continued)

FOREIGN PATENT DOCUMENTS

| EP | 2 759 527 A1 | 7/2014 | |
| JP | 2009062507 A * | 3/2009 | ............... C09D 5/02 |
| WO | WO 98/26927 A1 | 6/1998 | |

OTHER PUBLICATIONS

Machine translation of JP2009-062507. Retrieved Apr. 8, 2021.*
(Continued)

*Primary Examiner* — Prashant J Khatri
(74) *Attorney, Agent, or Firm* — Pillsbury Winthrop Shaw Pittman LLP

(57) ABSTRACT

A viscoelastic plastic interlayer intended to be arranged between two glass sheets of a glazing in order to provide it with vibroacoustic damping properties, includes two outer layers of thermoplastic adhesive, an inner layer arranged between the two outer layers, the inner layer having a loss factor tan δ greater than or equal to 1.6 at 20° C. and for a frequency range of between 2 kHz and 8 kHz, and first and second barrier layers arranged respectively between the outer layers and the inner layer 3, and composed of a viscoelastic plastic material.

16 Claims, 3 Drawing Sheets

(52) U.S. Cl.
CPC .. *B32B 17/10449* (2013.01); *B32B 17/10651* (2013.01); *B32B 17/10779* (2013.01); *B32B 17/10908* (2013.01); *B32B 2307/10* (2013.01); *B32B 2307/412* (2013.01); *B32B 2307/558* (2013.01); *B32B 2605/006* (2013.01)

(58) Field of Classification Search
CPC ....... C09J 133/00–133/26; C09J 7/385; G10K 11/00–11/36
See application file for complete search history.

(56) References Cited

U.S. PATENT DOCUMENTS

| | | |
|---|---|---|
| 2005/0050846 A1 | 3/2005 | Surace et al. |
| 2005/0196608 A1* | 9/2005 | Wouters ................. C09J 133/04 428/355 R |
| 2009/0011230 A1 | 1/2009 | Rymer et al. |
| 2009/0294212 A1* | 12/2009 | Miyai ............... B32B 17/10036 181/289 |
| 2011/0230621 A1* | 9/2011 | Hildebrandt .......... C08F 255/08 525/216 |
| 2016/0159039 A1 | 6/2016 | Lu et al. |
| 2017/0028687 A1* | 2/2017 | DeRosa .................. C08L 33/10 |

OTHER PUBLICATIONS

Lewarchik, R. "The Fundamentals of Emulsion Polymerization", https://knowledge.ulprospector.com/4911/pc-fundamentals-emulsion-polymerization/. Posted Aug. 5, 2016.*

International Search Report as issued in International Patent Application No. PCT/FR2018/051887, dated Nov. 23, 2018.

* cited by examiner

HYBRID POLYMER FOR VISCO-ELASTIC PLASTIC SPACER

CROSS-REFERENCE TO RELATED APPLICATIONS

This application is the U.S. National Stage of PCT/FR2018/051887, filed Jul. 23, 2018, which in turn claims priority to French patent application number 1757020 filed Jul. 24, 2017. The content of these applications are incorporated herein by reference in their entireties.

The invention relates to a viscoelastic plastic interlayer intended to be incorporated between two glass sheets in order to form a laminated glazing having vibroacoustic damping properties intended for a locomotive device, in particular an automotive vehicle. The invention also relates to a method for producing such an interlayer, in particular by means of a liquid coating process.

Acoustic protection glazings are used in the field of transportation as well as in construction. In order to improve acoustic comfort, noises such as those emitted by the engine, bearings, or suspensions are damped at their origin and during their airborne or structure-borne propagation.

In the field of transportation in particular, limiting the thickness and thus the total weight of glazings is a problem of the utmost importance.

In this context, the use of glazings of the laminated type having a thickness of less than 6 mm is known. These laminated glazings are generally in the form of an interlayer arranged between two external glass sheets according to a known method for producing laminated glazings, for example by assembly under heat and pressure.

In the case of a laminated glazing having vibroacoustic damping properties, this interlayer is itself composed of an inner layer arranged between two outer layers of thermoplastic adhesive. In a known manner, the inner layer is composed of a viscoelastic polymer which, even in relatively thin layers, exerts a noise-reducing effect. This polymer must meet all of the inherent conditions in the targeted field of transportation in the long term, i.e. during the entire useful life of the vehicle. These conditions include a low degree of turbidity, high transparency, and favorable resistance to oxidation and corrosion. Moreover, this polymer must ensure high-quality and durable joining with the adjacent layers and preserve its favorable noise-damping properties, even at extreme temperatures.

It should also be noted that with respect to the technical requirements inherent in the field of transportation, the interlayer must not impair the properties of the glazing with respect to safety. In the case of application in a windshield, the glazing must thus in particular provide sufficient stiffness to meet all of the conditions of mechanical resistance to strong impact of United Nations Regulation No. 43 (referred to as Regulation R43).

In order to meet these various technical requirements, the method is known of using a tri-layer acoustic interlayer of PVB composed of an inner layer of flexible PVB arranged between two layers of standard PVB.

In view of the constant demand in the motor vehicle market for improvement in acoustic comfort, there is nevertheless a need to provide an interlayer for laminated glazing having improved acoustic insulation, both airborne and structure-borne, in particular at the coincidence frequency, while retaining satisfactory characteristics in terms of stiffness, fineness, and lightness.

The present invention meets this need. More particularly, in at least one embodiment, the proposed technology relates to a viscoelastic plastic interlayer intended to be arranged between two glass sheets of a glazing in order to provide it with vibroacoustic damping properties, the interlayer comprising:
  two outer layers of thermoplastic adhesive, preferably of standard polyvinyl butyral (PVB), the thickness of which is preferably between 0.2 and 0.8 mm,
  an inner layer arranged between the two outer layers, said inner layer having a loss factor tan δ greater than or equal to 1.6 at 20° C. and for a frequency range of between 2 kHz and 8 kHz, and
  a first and a second barrier layer arranged respectively between said outer layers and the inner layer and composed of a viscoelastic plastic material, preferably polyester, in particular polyethylene terephthalate (PET).

In the following description, the term "thermoplastic adhesive" refers to the various resins and/or films making it possible to characterize the type of interlayer used. The thermoplastic adhesives, also referred to as "skins" in the context of a multilayer interlayer, thus form a group comprising at least polyvinyl butyral (PVB), ethylene vinyl acetate (EVA), Ionoplast polymers, thermoplastic polyurethane (TPU), and casting resins.

Because it is synthesized by radical polymerization of vinyl acetate, hydrolysis of poly(vinyl acetate) to obtain poly(vinyl alcohol) (PVOH), and then acetalization by butyraldehyde, PVB is always a terpolymer composed of vinyl alcohol, vinyl acetate, and vinyl butyral units.

In the present application, the term "standard PVB" is understood to refer to PVBs whose molar ratio of vinyl butyral (VB) units is within the following ranges:
  the molar ratio of VB is greater than 42%, preferably greater than 44%, preferably greater than 46%, preferably greater than 48%, preferably greater than 50%, preferably greater than 52%, preferably greater than 53%, preferably greater than 53.5%, preferably greater than 54%, preferably greater than 54.5%, preferably greater than 55%, and preferably greater than 55.5%, and is less than 60%, preferably less than 59.5%, preferably less than 59%, preferably less than 58.5%, preferably less than 58%, preferably less than 58.5%, preferably less than 58%, preferably less than 57.5%, preferably less than 57%, and preferably less than 56.5% based on the total number of monomer units of PVB,
  the weight ratio of plasticizers expressed in parts per 100 parts of PVB resin (phr) is greater than 5 phr, preferably greater than 10 phr, preferably greater than 20 phr, preferably greater than 22.5 phr, and preferably greater than 25 phr, and is less than 120 phr, preferably less than 110 phr, preferably less than 90 phr, preferably less than 75 phr, preferably less than 60 phr, preferably less than 50 phr, preferably less than 40 phr, preferably less than 35 phr, and preferably less than 30 phr,
  the glass transition temperature for a frequency of 100 Hz is greater than 30° C., preferably greater than 40° C., and is less than 60° C., preferably less than 56° C.

According to a particular aspect of the invention, the thickness of the outer layers of thermoplastic adhesive is greater than 0.2 mm in order to prevent insufficient stiffness from impairing the properties of the glazing in terms of safety.

The term "barrier layers" refers to two layers whose function is to prevent any chemical diffusion between the inner layer, also referred to as the "core," and the outer layers, also referred to as "skins." According to a particular embodiment, at least one of these barrier layers is composed of PET. In addition to the advantageous characteristics mentioned above, the surface properties of PET allow it to bond equally favorably to both the material constituting the core and the layers of thermoplastic adhesive, such that the laminated glazings according to the invention meet all of the necessary technical requirements, even with respect to long-term resistance and safety.

The loss factor tan δ corresponds to the ratio of the energy dissipated in caloric form to the energy of elastic deformation. It therefore corresponds to a technical property inherent in the nature of a material and reflects its capacity to dissipate energy, in particular that of acoustic waves. This loss factor tan δ varies as a function of the temperature and frequency of the incident wave. For a given frequency, the loss factor reaches its maximum value at a temperature referred to as the glass transition temperature. This loss factor tan δ can be estimated using a viscoanalyzer or any other suitable known device. It should be noted that the loss factor tan δ of the inner layer determines the loss factor tan δ of the interlayer, which is substantially of the same value, provided that the volume fraction of the inner layer is not too low.

The invention is based on the novel and inventive concept of providing an interlayer with a core whose properties make it possible to obtain a laminated glazing having improved acoustic insulation, both airborne and structure-borne, while retaining satisfactory characteristics in terms of stiffness, fineness, and lightness. It has been found that this improvement in acoustic insulation is significant in the frequency range of between 2000 Hz and 8000 Hz, the range to which the human ear is most sensitive, and in particular at the level of the coincidence frequency, at which the glazings usually show a decrease in their acoustic insulation performance.

According to a particular aspect of the invention, said loss factor tan δ of the inner layer is greater than or equal to 2, preferably 2.5, preferably 3, preferably 3.5, preferably 4, and preferably 4.5. The loss factor tan δ is generally less than 5.

The implementation of an interlayer whose core has a relatively higher loss factor tan δ makes it possible to further improve the acoustic insulation performance of the interlayer and the glazing provided therewith.

According to an embodiment, the inner layer has a shear parameter $g=G'/e$ of between $4.3 \cdot 10^9$ and $4.5 \cdot 10^{10}$ Pa/m at 20° C. and for a frequency range of between 2 kHz and 8 kHz, G' being the shear modulus of the inner layer and e the thickness of the inner layer.

An inner layer having such mechanical shear characteristics imparts to the interlayer comprising it satisfactory stiffness and acoustic insulation performance.

According to a particular aspect of the invention, the interlayer has a shear parameter $g=G'/e$ of between $4.8 \cdot 10^9$ and $5.1 \cdot 10^{10}$ Pa/m at 20° C. and for a frequency range of between 2 kHz and 8 kHz, G' being the shear modulus of the interlayer and e the thickness of the interlayer.

An interlayer provided with such mechanical shear characteristics shows satisfactory stiffness and acoustic insulation performance.

According to a particular aspect of the invention, the inner layer is obtained from a colloid, preferably an emulsion, and preferably an aqueous emulsion of at least one polymer.

In the following description, the term "colloid" refers to a suspension of one or a plurality of substances dispersed in a regular manner in another substance that forms a system with two separate phases. In a fluid, this colloid forms a homogeneous dispersion of nm- to μm-sized particles. An emulsion is a colloid wherein these substances are in a liquid state. In the scientific literature, an aqueous polymer emulsion is also referred to as a "polymer latex", these two expressions being equivalent.

The colloids available on the market, and in particular the polymer emulsions, are characterized by having a milky appearance. This at least partial opacity would appear to constitute a fatal flaw preventing any implementation between two transparent glass sheets. Moreover, colloids are not always suitable for application in the form of layers of reduced thickness. The production of an interlayer comprising a colloid as a core material would thus appear to be impossible, and even more so on an industrial scale. It is for these reasons, among others, that colloids are not usually used in the field of laminated glass.

Surprisingly, however, the inventors found that certain types of colloids, once integrated into an interlayer according to the invention, show remarkable acoustic damping properties, while at the same time meeting the other technical requirements expected of a core material. In order to achieve this result, the inventors overcame a variety of technical biases. For example, it was initially found that the colloid, when applied in the form of a reduced-thickness layer of a μm-order thickness, loses its milky appearance while drying and gains transparency to a degree sufficient to allow its incorporation into an optical device. Furthermore, a liquid coating process was developed by the inventors, as described in the description below, in order to allow the deposition on and integration into an interlayer of a core obtained from such a colloid.

According to a particular aspect of the invention, the inner layer is obtained from an aqueous emulsion of at least two polymers having an interpenetrating network structure, said two polymers preferably being acrylate and acrylic.

According to this embodiment, the two polymers having an interpenetrating network structure form a single particle suspended in water.

According to a particular aspect of the invention, the inner layer comprises between 33 and 65% by weight of acrylate polymer and between 25 and 40% by weight of water.

Such an inner layer is characterized by a loss factor tan δ greater than or equal to 3, and therefore shows excellent acoustic insulation performance.

According to a particular aspect of the invention, said inner layer has a thickness of between 0.5 and 50 μm, preferably between 10 and 40 μm, and preferably between 20 and 30 μm.

The use of a core of μm-order thickness makes it possible to reduce the risk of runoff of the material constituting the core during the deposition thereof, as the shear forces at this thickness are the same as those of the inner layer for the classical acoustic PVBs. The use of such a thickness therefore makes it possible to overcome a technical difficulty that appears a priori to prevent the use of such an emulsion for forming the core material.

According to a particular aspect of the invention, the inner layer accounts for a volume fraction of the interlayer of between 0.2% and 8%, preferably between 0.5% and 6%, and preferably between 2.5 and 4%.

The selection of such a volume fraction of the inner layer on the interlayer provides a satisfactory compromise between the requirements of stiffness on the one hand and acoustic insulation performance on the other.

According to an embodiment of the invention, each of said first and second barrier layers has a thickness of between 1 and 50 μm, preferably between 1 and 30 μm, and preferably between 5 and 15 μm.

This thickness must be great enough to prevent the migration of chemical species between the inner layer 3 and the outer layers (4, 5). On the other hand, from a certain thickness value of the outer layer (4, 5) on, the increase in the stiffness of the interlayer is too great and causes problems during shaping of the interlayer.

According to an embodiment of the invention, the interlayer is dyed in the mass on part of its surface and/or has a decreasing cross-section tapering in a wedge shape from the top toward the bottom of a laminated glazing in which it is intended to be arranged and/or comprises particles having the function of filtering infrared radiation.

The invention also relates to a laminated glazing comprising:
a first glass sheet,
a second glass sheet, and
an interlayer as described above, the interlayer being arranged between the first and second glass sheets.

The technical advantages provided by an interlayer according to the invention, as described in the present text, also relate to a laminated glazing comprising such an interlayer.

According to a particular aspect of the invention, said first glass sheet has a thickness of between 0.5 and 2.1 mm, preferably between 1.4 and 2.1 mm, and said second glass sheet has a thickness of between 0.5 and 2.1 mm, preferably between 1.1 and 1.6 mm.

The invention also relates to the use of a glazing as described above as a vehicle windshield.

The invention also relates to the use of a glazing as described above as a construction glazing, either as a single glazing or integrated into a multiple glazing.

The invention also relates to a method for producing an interlayer as described above comprising at least one step of deposition on the first or the second barrier layer, by means of a liquid coating process, of an inner layer from an aqueous emulsion of at least one polymer.

The deposition by a liquid process of an aqueous emulsion that has first been diluted in a volume of water greater than or equal to 1.5 times its own volume makes it possible to reduce the viscosity of the mixture and thus to allow its subsequent deposition in the form of a reduced-thickness layer.

Other characteristics and advantages of the invention are described in the following with reference to the figures, which are as follows.

The reference numbers that are identical in the various figures represent similar or identical elements.

It should be noted that the expression "of between . . . and . . . " is inclusive of the boundary values of the range.

The invention relates to a viscoelastic plastic interlayer intended to be arranged between two glass sheets (1, 2) of a glazing in order to impart to it vibroacoustic damping properties, the interlayer comprising:
two outer layers (4, 5) of thermoplastic adhesive,
an inner layer 3 arranged between the two outer layers (4, 5), said inner layer 3 having a loss factor tan δ greater than or equal to 1.6 at 20° C. and for a frequency range of between 2 kHz and 8 kHz, and
first and second barrier layers (6, 7) arranged respectively between said outer layers (4, 5) and the inner layer 3 and composed of a viscoelastic plastic material.

The interlayer can therefore be considered to comprise a total of three active layers for acoustic insulation separated from one another by barrier layers whose function is to prevent any chemical diffusion between the inner layer 3 and the outer layers (4, 5). This interlayer structure, in particular this alternation between stiffer and less damping layers and a less stiff and more damping layer, provides the glazing with improved acoustic insulation properties, in particular within a frequency range of between 2000 Hz and 8000 Hz.

The interlayer according to the invention is intended to be incorporated between two glass sheets (1, 2) to form a laminated glazing.

Figure 1:
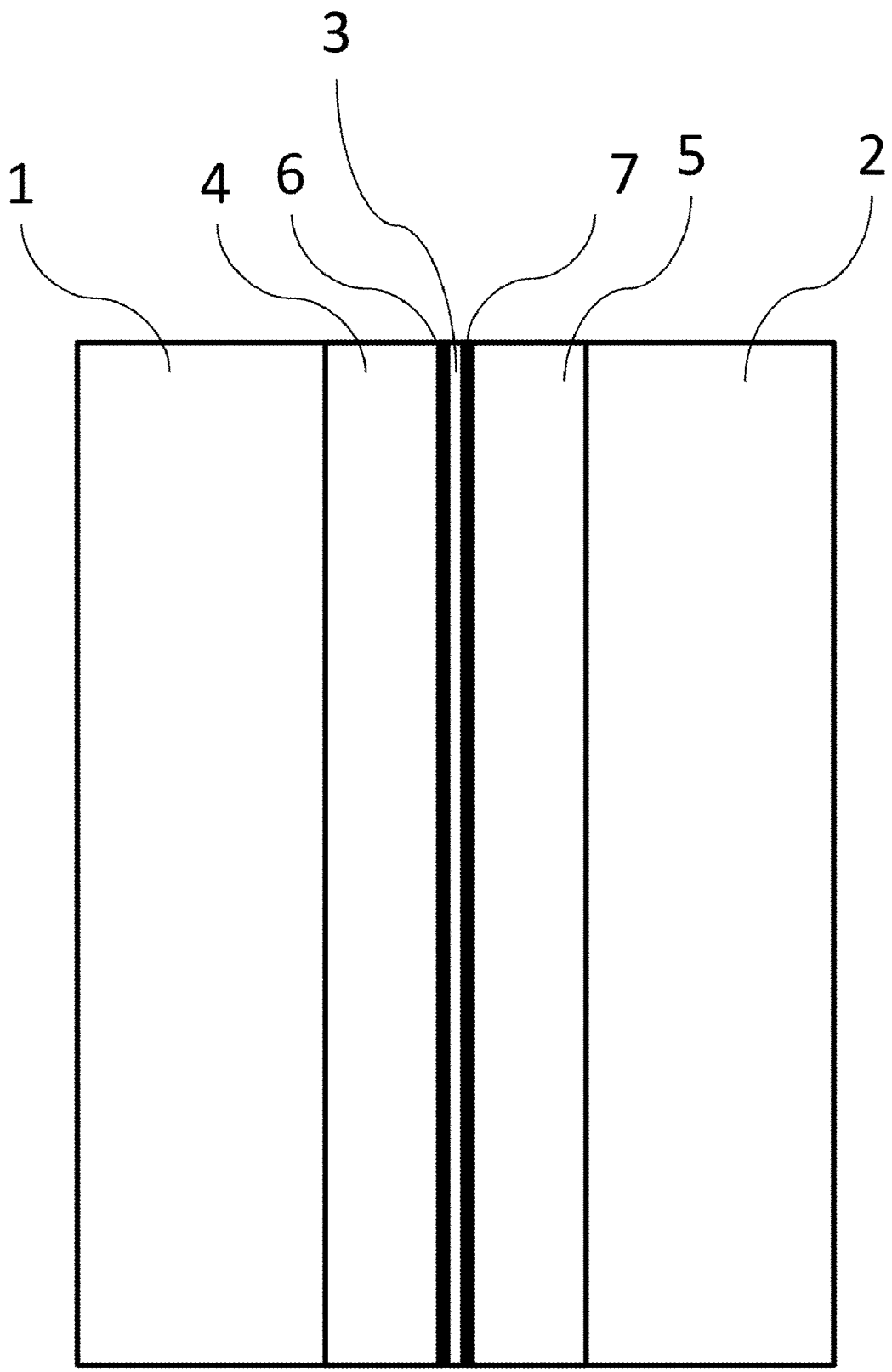
FIG. 1 is a schematic sectional view of a glazing according to a particular embodiment of the invention.

FIG. 1 shows a sectional view of a glazing according to a first embodiment of the invention.

The glazing comprises two glass sheets (1, 2) between which the interlayer according to the invention is inserted. The outer layers (4, 5) are thus in contact with the glass sheets respectively (1, 2). The core 3 is intercalated between these outer layers (4, 5). Joining of the interlayer with the glass sheets is carried out for example by known means, for example by stacking the glass sheets and the interlayer and passing the assembly through an autoclave.

The thickness of each glass sheet (1, 2) is for example between 0.5 mm and 2.1 mm for an automotive glazing application, for example a windshield, and between 0.5 mm and 15.0 mm for a construction glazing application.

In the case of application in a windshield, the glazing meets all of the conditions of resistance to strong impact of United Nations Regulation No. 43 (referred to as Regulation R43) in order to ensure its mechanical resistance.

For application in an automotive glazing, glass sheet 1 of the glazing is intended to be turned toward the exterior of the vehicle, while glass sheet 2 is intended to be turned toward the interior of the vehicle. Glass sheet 1 is for example thicker than glass sheet 2 so that the glazing allows improved protection from detrimental outside influences (bad weather, rebounding gravel, etc.). In existing automotive glazings, the thickness of glass sheet 1 is generally 2.1 mm, and the thickness of glass sheet 2 is generally 1.6 mm.

In the example of FIG. 1, the outer layers (4, 5) are composed of standard PVB. These outer layers (4, 5) have a shear modulus G' of greater than or equal to $1 \cdot 10^8$ Pa and a loss factor tan δ of less than 0.4 at 20° C. and for a frequency range of between 1 kHz and 10 kHz. They thus allow favorable mechanical strength of the interlayer.

The core 3 of the interlayer has a thickness of 25 µm, and its volume accounts for about 3% of the total volume of the interlayer. The selection of this value for the volume fraction of the inner layer 3 with respect to the interlayer provides a satisfactory compromise between the requirement of stiffness on the one hand and acoustic insulation performance on the other.

For example, the core 3 is composed of an aqueous emulsion of acrylate and acrylic referred to as QuietGlue®, which is described in the patent document US 2005/0050846. According to another embodiment, the core 3 can also be composed of GreenGlue®.

In its known use, the industrial adhesive QuietGlue®, which has a milky appearance and is yellow in color, is packaged and marketed in large-capacity tubes or containers. Such an adhesive is intended to be applied by a construction worker between sheets of construction materials composed of wood, metal, plastic and/or plaster. The common characteristic of these materials is that they are completely opaque. After application, the layer of QuietGlue® generally has thickness of about 1.6 mm.

The yellow color and opacity of QuietGlue® would appear to constitute a fatal flaw preventing any implementation between two transparent glass sheets required to be transparent. Moreover, QuietGlue®, as its name indicates, shows a strong adhesion strength that would appear to make any application in the form of a reduced-thickness layer impossible. Finally, a considerable drying period of between 24 and 48 hours is recommended by the manufacturer for application of this adhesive. The production of an interlayer comprising QuietGlue® as its core material would therefore appear to be impossible.

Surprisingly, however, the inventors found that once integrated into an interlayer in the form of a reduced-thickness layer by means of a novel deposition process, QuietGlue® shows remarkable acoustic damping properties, while at the same time meeting the other technical requirements expected of a core material.

In order to achieve this result, the inventors overcame a variety of technical biases. For example, it was initially found that QuietGlue®, when applied in the form of a reduced-thickness layer having a μm-order thickness, loses its milky appearance while drying and gains transparency to a degree sufficient to allow its incorporation into the interlayer. Furthermore, a liquid coating process was developed by the inventors, as described in the description below, in order to allow deposition on and integration into an interlayer of a core obtained composed of QuietGlue®.

Dynamic analysis of the film interlayer is carried out on a viscoanalyzer of the Metravib type under specified measuring conditions, which are given below:
sinusoidal stressing,
so-called double shear test piece composed of two rectangular parallelepipeds having the following dimensions:
thickness=3.31 mm
width=10.38 mm
height=6.44 mm
dynamic amplitude: ±5 mm around the rest position,
frequency range: 2000 to 8000 Hz
temperature: 20° C.

The viscoanalyzer makes it possible to subject a sample of material to stress deformation under precise conditions of temperature and frequency, and thus to obtain and process in their entirety the rheological parameters characterizing the material. The use of raw data for measurements of force, displacement and phase shift as a function of frequency at each temperature makes it possible in particular to calculate the elastic component (or shear modulus) G' and the loss factor tan δ.

According to this experimental protocol, the measurements showed that a reduced-thickness layer 25 μm in thickness of QuietGlue® has a loss factor tan δ with a value of 4, as well as a shear parameter $g=G'/e$ of between $4.3 \cdot 10^9$ and $4.5 \cdot 10^{10}$ Pa/m at 20° C. and for a frequency range of between 2 kHz and 8 kHz.

Figure 2:
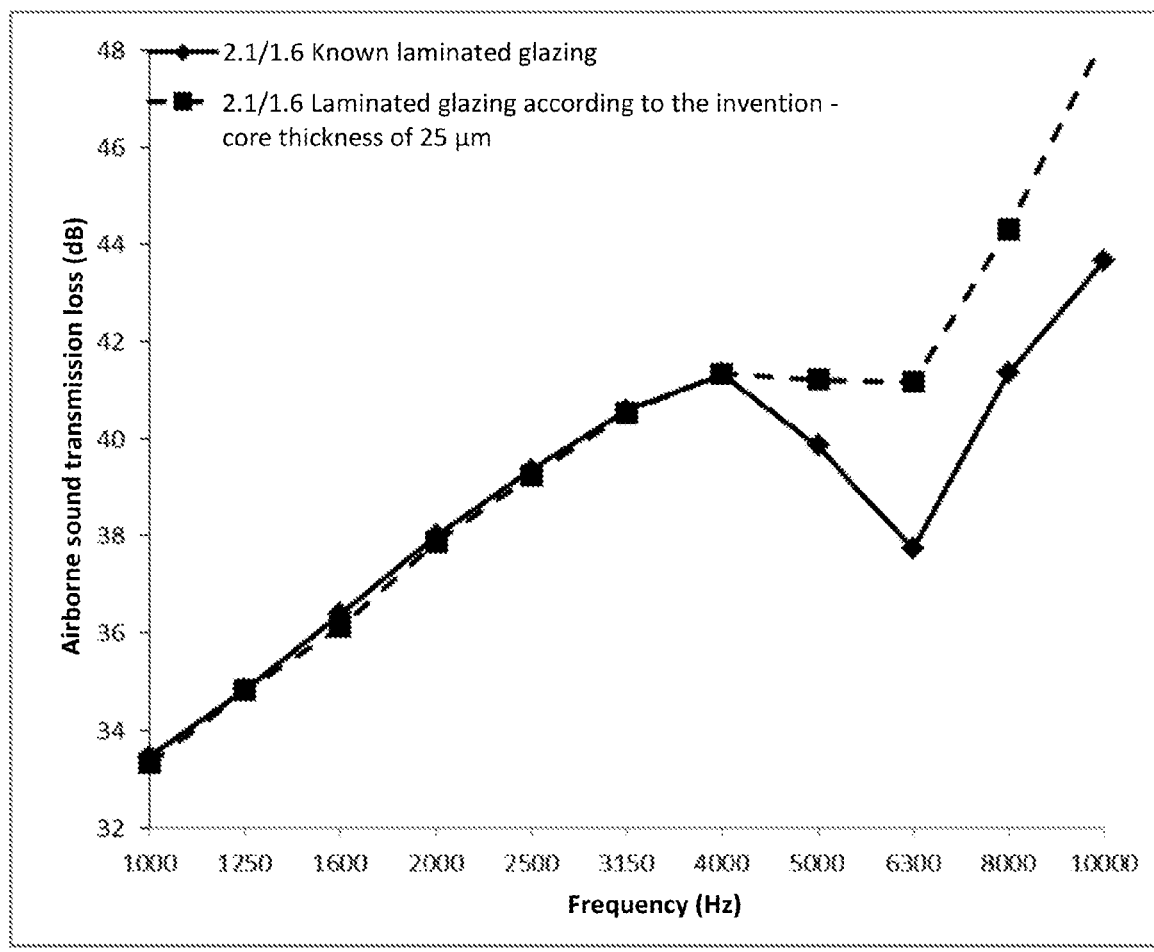
FIG. 2 is a graph showing an evaluation of the properties of airborne sound insulation (STL, sound transmission loss) as a function of frequency for a laminated glazing according to the invention and a known laminated glazing.
Figure 3:
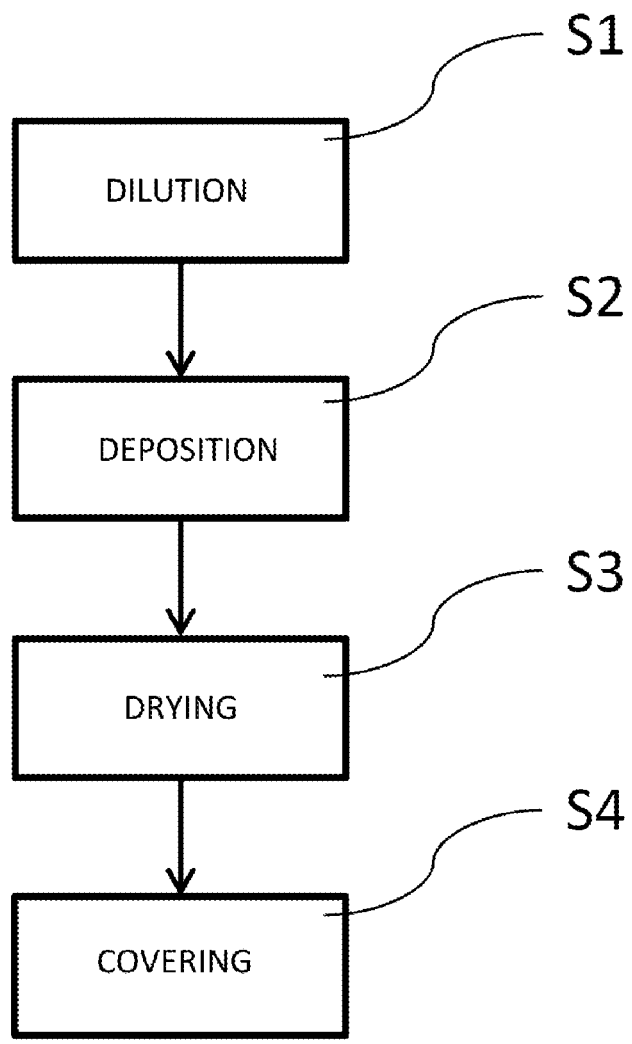
FIG. 3 is a flow chart of a process for producing an interlayer according to an embodiment of the invention.

FIG. 2 shows an estimated curve of airborne noise insulation (STL) performance as a function of frequency evaluated for two laminated glazings according to the standard NF EN ISO 10140 and with a sample size of $0.8 \times 0.5$ m$^2$: a laminated glazing according to the invention and a known laminated glazing.

A first laminated glazing (referred to as "known") comprises:
two glass sheets having thicknesses of 2.1 mm and 1.6 mm respectively, and
an interlayer of acoustic PVB comprising two outer layers of standard PVB and an inner layer of viscoelastic plastic having improved vibroacoustic damping properties.

The first laminated glazing corresponds to a classical glass windshield composition with an interlayer having known acoustic damping properties. The interlayer could for example be replaced by the interlayer Trosifol VG+SC marketed by Kuraray, the interlayer Saflex® Vanceva Quiet QC41 marketed by Solutia, or the interlayer S-Lec Acoustic Film HI-RZN12 marketed by Sekisui. This is the laminated glazing referred to as "known." The acoustic damping properties of this acoustic PVB remain limited by the very nature of the polymer, which generally has a loss factor tan δ of less than 1.2 at 20° C. and for a frequency range of between 2 kHz and 8 kHz.

The curve of acoustic insulation of airborne noise of the first laminated glazing is indicated by diamonds.

A second laminated glazing (referred to as "according to the invention") comprises:
two glass sheets having thicknesses of 2.1 mm and 1.6 mm respectively, and
an interlayer according to the invention, comprising two outer layers of standard PVB and an inner layer 25 μm in thickness of QuietGlue®.

The second laminated glazing corresponds to a laminated glazing according to the invention.

The curve of acoustic insulation of airborne noise of the second laminated glazing is indicated by squares.

The curve of acoustic insulation of airborne noise (indicated by the squares) of the second laminated glazing shows an improvement in acoustic insulation of airborne noise over the entire range of frequencies, i.e. between 2000 Hz and 8000 Hz, compared to the first laminated glazing taken as a reference. It is in the range of between about 2000 and 8000 Hz inclusively and the range of the coincidence frequency at about 6300 Hz in particular, in which the damping curves of the glazings show the greatest troughs in the case of the conventional laminated glazing, that the degrees of acoustic damping are sharply more elevated. At the coincidence frequency, one thus observes an increase in acoustic insulation of 3.4 dB between the respective values of 37.7 dB for the acoustic PVB and 41.2 dB for the interlayer according to the invention. A considerable improvement in acoustic damping is therefore achieved overall.

One can therefore observe a remarkable effect resulting from the assembly of several layers of viscoelastic materials of different properties and natures (in terms of damping and mechanical stiffness), which in combination form a new-generation acoustic insulation interlayer that shows increased damping while at the same time showing stiffness that is equal or even superior to that of a classical acoustic PVB.

The invention also relates to a laminated glazing comprising:
two glass sheets having a respective thicknesses of 2.1 mm and 1.6 mm, and
an interlayer according to the invention, for example comprising a core of QuietGlue® 25 μm in thickness.

The technology according to the invention proposes a laminated glazing for a vehicle comprising an interlayer film showing favorable damping of structure-borne noise. This damping can also meet the requirements of insulation against aerodynamic and external noises. The glazing according to the invention thus allows overall favorable acoustic protection to be achieved.

Moreover, the interlayer according to the invention may:

be dyed in the mass on a part of its surface in order to allow the privacy of persons inside the vehicle to be preserved, protect the driver of a vehicle from the glare of sunlight, or simply for an esthetic effect, and/or have a decreasing cross-section tapering in a wedge shape from the top toward the bottom of the laminated glazing in order to allow the glazing be used as a screen for a head-up display (HUD) system, and/or comprise particles having a function of filtering infrared light in order to limit the increase in the interior temperature of a vehicle due to infrared solar radiation so as to improve passenger comfort.

The invention also relates to a method for producing an interlayer as described above.

A given amount of an aqueous emulsion of at least one polymer, for example QuietGlue®, is first diluted (step S1) in a volume of water that is at least 1½, or even 3 (three) times its own volume, in particular in order to reduce the viscosity of the mixture and thus allow its subsequent deposition in the form of a reduced-thickness layer.

The assembly is then deposited (step S2) by a liquid coating process on a first outer layer 4 of classical PVB covered with a barrier layer 6 of PET.

The whole is then dried (step S3) for 1 hour at a temperature of 80° C. In view of the extremely low thickness of the core 3, the drying time ordinarily recommended for the QuietGlue® is significantly reduced, making its use as a core material industrially feasible. The transparency of the QuietGlue® is also considerably increased, to the point of allowing its use in an optical device. It should be noted that according to alternative embodiments, it is possible to vary the drying time and/or temperature of the QuietGlue® without departing from the scope of the invention.

Following the drying step S3, the QuietGlue® once again has its initial composition. It can then be covered (step S4) with a second barrier layer 7 of PET and then a second outer layer 5 of standard PVB. In this manner, one obtains an interlayer according to the invention.

The invention claimed is:

1. A viscoelastic plastic interlayer intended to be arranged between two glass sheets of a glazing in order to impart to it vibroacoustic damping properties, the interlayer comprising:

two outer layers of thermoplastic adhesive, an inner layer arranged between the two outer layers, said inner layer having a loss factor tan δ greater than or equal to 1.6 at 20° C. and for a frequency range of between 2 kHz and 8 kHz, and first and second barrier layers arranged respectively between said outer layers and the inner layer and composed of a viscoelastic plastic material, wherein the inner layer is formed from an aqueous emulsion of at least two polymers having an interpenetrating network and the two polymers are an acrylate and an acrylic.

2. The viscoelastic plastic interlayer as claimed in claim 1, wherein said loss factor tan δ of the inner layer is greater than or equal to 2.

3. The viscoelastic plastic interlayer as claimed in claim 1, wherein the inner layer has a shear parameter $g=G'/e$ of between $4.3 \cdot 10^9$ and $4.5 \cdot 10^{10}$ Pa/m at 20° C. and for a frequency range of between 2 kHz and 8 kHz, G' being the shear modulus of the inner layer and e the thickness of the inner layer.

4. The viscoelastic plastic interlayer as claimed in claim 1, wherein the viscoelastic plastic interlayer has a shear parameter $g=G'/e$ of between $4.8 \cdot 10^9$ and $5.1 \cdot 10^{10}$ Pa/m at 20° C. and for a frequency range of between 2 kHz and 8 kHz, G' being the shear modulus of the interlayer and e the thickness of the interlayer.

5. The viscoelastic plastic interlayer as claimed in claim 1, wherein said inner layer has a thickness of between 0.5 and 50 μm.

6. The viscoelastic plastic interlayer as claimed in claim 1, wherein a volume fraction of the inner layer with respect to the interlayer is between 0.2% and 8%.

7. The viscoelastic plastic interlayer as claimed in claim 1, wherein each of said first and second barrier layers has a thickness of between 1 and 50 μm.

8. The viscoelastic plastic interlayer as claimed in claim 1, wherein the interlayer is dyed in the mass on a part of its surface and/or has a decreasing cross-section tapering in a wedge shape from the top toward the bottom of a laminated glazing in which it is intended to be arranged and/or comprising particles having a function of filtering infrared light.

9. The viscoelastic plastic interlayer as claimed in claim 1, wherein the two outer layers are each made of polyvinyl butyral (PVB) and have a thickness between 0.2 and 0.8 mm.

10. The viscoelastic plastic interlayer as claimed in claim 1, wherein the first and second barrier layers are made of polyester.

11. The viscoelastic plastic interlayer as claimed in claim 10, wherein the first and second barrier layers are made of polyethylene terephthalate (PET).

12. A laminated sheeting comprising:

a first glass sheet, a second glass sheet, and an interlayer as claimed in claim 1, the interlayer being arranged between the first and second glass sheets.

13. The laminated sheeting as claimed in claim 12, wherein:

said first glass sheet has a thickness of between 0.5 and 2.1 mm, and said second glass sheet has a thickness of between 0.5 and 2.1 mm.

14. A method comprising utilizing a glazing as claimed in claim 12 as a vehicle windshield.

15. A method comprising utilizing a glazing as claimed in claim 12 as a construction glazing, either as a single glazing or integrated into a multiple glazing.

16. A method for producing an interlayer as claimed in claim 1, comprising at least one deposition step on the first or the second impermeable layer, by means of a liquid coating process, of an inner layer from an aqueous emulsion of at least two polymers having an interpenetrating network and the two polymers are an acrylate and an acrylic.

* * * * *